Dec. 29, 1931.  C. R. RANEY ET AL  1,838,451
HARVESTER THRASHER
Filed July 26, 1926  5 Sheets-Sheet 3

Inventors
C. R. Raney
and A. E. W. Johnson
By H. P. Doolittle
Atty

Dec. 29, 1931.  C. R. RANEY ET AL  1,838,451
HARVESTER THRASHER
Filed July 26, 1926   5 Sheets-Sheet 4

Inventors:
C. R. Raney
and A. E. W. Johnson.
By [signature]
Atty.

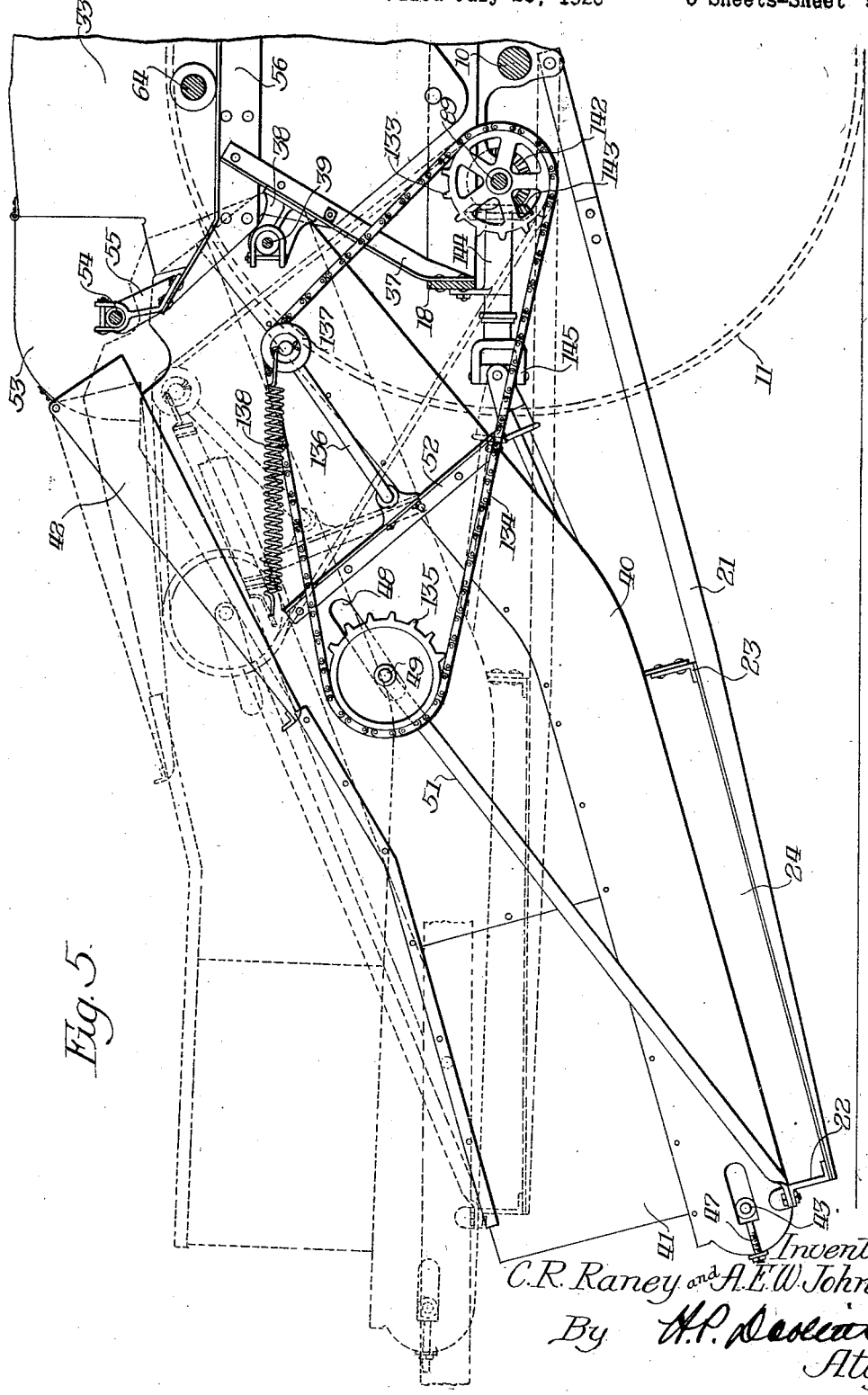

Patented Dec. 29, 1931

1,838,451

UNITED STATES PATENT OFFICE

CLEMMA R. RANEY, OF RIVERSIDE, AND ARNOLD E. W. JOHNSON, OF CHICAGO, ILLINOIS, ASSIGNORS TO INTERNATIONAL HARVESTER COMPANY, OF CHICAGO, ILLINOIS, A CORPORATION OF NEW JERSEY

HARVESTER THRASHER

Application filed July 26, 1926. Serial No. 124,990.

This invention relates to harvesters, and particularly to harvester-thrashers.

Acknowledgment is hereby made of Australian Patent No. 2397/26 taken out by the present applicants and showing a part of the present invention.

As is well known, these machines combine the functions of a harvester header with that of a thrashing machine, so that the combined structure may travel in a grain field and perform the dual function in one passage through the field, of reaping and thrashing.

In general, these harvester-thrashers comprise a wheel supported frame structure upon which is mounted a thrasher, or separating mechanism. Forwardly of this separating mechanism the frame carries a conveyer or feeding mechanism. Laterally offset with respect to the feeding mechanism is the harvester or reaper mechanism, which cuts and gathers the grain and conveys it to the feeding mechanism, which in turn, delivers the grain to the thrashing mechanism where it is separated. The harvesting mechanism may be adjusted vertically up or down to take care of grain which varies in length. Likewise, suitable driving connections are provided for operating all of these mechanisms. In these machines the weed and grain seeds may be separated from each other and be discharged at different points into suitable receivers.

In the past, because of so much mechanism involved, these machines have been heavy and cumbersome. Also the grain in coming from the harvester was elevated to quite a high plane to the separating mechanism where the thrashing operation was performed.

With this general statement of these machines, it is the main object of this invention to provide a harvester-thrasher which will be simple and light in construction without sacrificing necessary strength and still permit the same to operate efficiently for the purposes intended.

More specific objects are to provide a "low down" type of machine in which the cut grain from the header platform will travel in a path to the separator involving only a relatively slight rise, and one in which the major thrashing operation will be performed in a horizontal plane disposed below the plane of the top of the thrashing cylinder.

Still other objects are to provide an improved feeding mechanism from the header platform to the thrashing mechanism; to provide in combination with a rigid thrasher supporting frame a movable harvester or header supporting frame upon which the feeder mechanism rests, so that when the heading mechanism is adjusted vertically, the feeding mechanism may have a relative sliding movement with respect to the harvesting mechanism supporting frame without altering the relative location of parts in the feeder; to provide an improved separating mechanism; and, lastly, generally to improve machines of this character.

Other objects will, of course, be apparent to those skilled in the art to which this machine relates, as the specific description of the parts and cooperating mechanisms hereinafter progresses.

Briefly, these very desirable objects are accomplished in the provision of a harvester-thrasher having a rigid main frame supported on an axle carried upon a main wheel and a grain wheel. The forward end of this rigid main frame is carried on the usual pilot or steering truck. The rigid main frame supports the thrasher, or separating mechanism, which is longitudinally disposed thereon and embodies a relatively "low down" thrashing cylinder. Offset laterally from the rigid main frame the axle carries a supplemental, or movable, frame upon which is mounted the header or harvester platform. The harvester platform slidably carries a longitudinally disposed feeder mechanism which extends forwardly of and is pivotally connected to the front end of the thrasher mechanism. The harvester platform and feeder are in direct communication. In adjusting the header up or down, the feeder housing moves up or down with the harvester platform and slides thereover because said feeder is hung on pivots connected to the front end of the separating mechanism, the header being pivoted on the main axle.

The thrashing cylinder is driven from an engine carried on the frame of the machine. From the thrashing cylinder the power is distributed, by suitable gearing connections, to operate all of the moving parts of the thrasher and the header or harvester.

The grain, of course, is cut by the header and is conveyed in a slight rise from the platform directly to the feeder, which feeds it with a second slight rise directly into the thrasher, where the grain is separated by a first, or primary, cleaning or separating mechanism, the greater percentage of the chaff and straw being expelled from the machine at this step in the operation. The mechanism which performs this major thrashing operation is relatively low and lies in a plane beneath the top of the thrashing cylinder. All of the grain, along with such chaff and straw as remains, is then elevated into a second separating or recleaner mechanism mounted above the main cleaner or separating mechanism. Here the grain and straw are thoroughly separated, the chaff and straw remaining, being expelled from the machine, while the grain is next passed along with any weed seed into a classifier mechanism, which is provided with suitable mechanism for separating weed seed from grain seed. The grain travels through this classifier to discharge spouts, while the weed seed passes out through another discharge spout. This classifier with its spouts may be disposed directly over a bagging platform attachment carried by the rigid part, or main frame, of the machine. An operator on this platform attends the bag filling operation.

With this brief introductory description, we will now pass on and view the accompanying sheets of drawings illustrating an embodiment which this invention may assume in practice.

The same characters of reference are used to denote like parts throughout the different views.

In these drawings,

Figure 5 is a side elevational view illustrating the pivotal mounting for the header platform on the axle of the machine and the feeder housing slidable relative to the header platform and its pivotal connection to the front end of the thrasher housing;

Figure 6 is a front sectional view along the line 6—6 of Figure 1, showing how the platform conveyer communicates with the feeder;

Figure 7 is a detail elevational view of the mechanism which distributes the grain to the recleaner, as viewed in the direction of the arrows along line 7—7 shown in Figure 4; and Figure 8 is an end sectional view of the same structure looking in the direction of the arrows along the line 8—8 of Figure 7.

In the detailed description or specification, which now ensues, it has been decided, for the sake of convenience, to divide the machine into groups, or descriptive chapters, because the same readily and logically lends itself to a description of such character. After each group has been specifically described, a concluding or summary chapter combining the groups and summarizing the use and operation of the complete machine will be made.

Accordingly, it has further been deemed advisable to list these group or chapter headings in seriatim at this time, as they will appear in the specification.

I. The main or rigid frame;

II. The movable frame, and the header to the feeder;

III. The thrasher or separator and the feeder;

IV. The complete driving mechanism;

V. Means for adjusting the header platform;

VI. Summary: Operation of complete machine.

With this catalog of chapters in mind, we may now proceed with the specification.

*I. The main or rigid frame*

Figure 1:
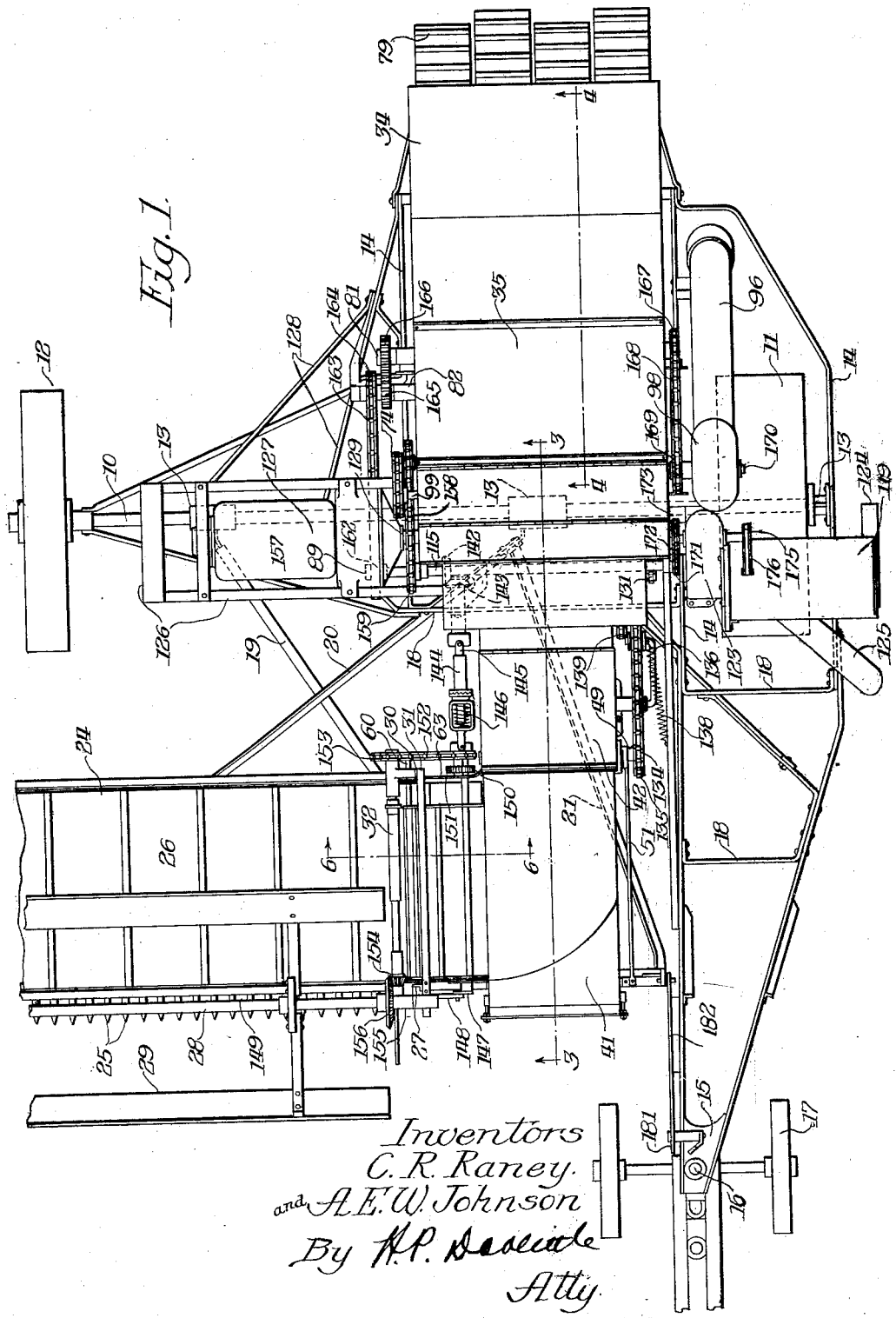
Figure 1 is a general plan view of the harvester-thrasher with the extreme grainward end of the header platform cut off.
Figure 2:
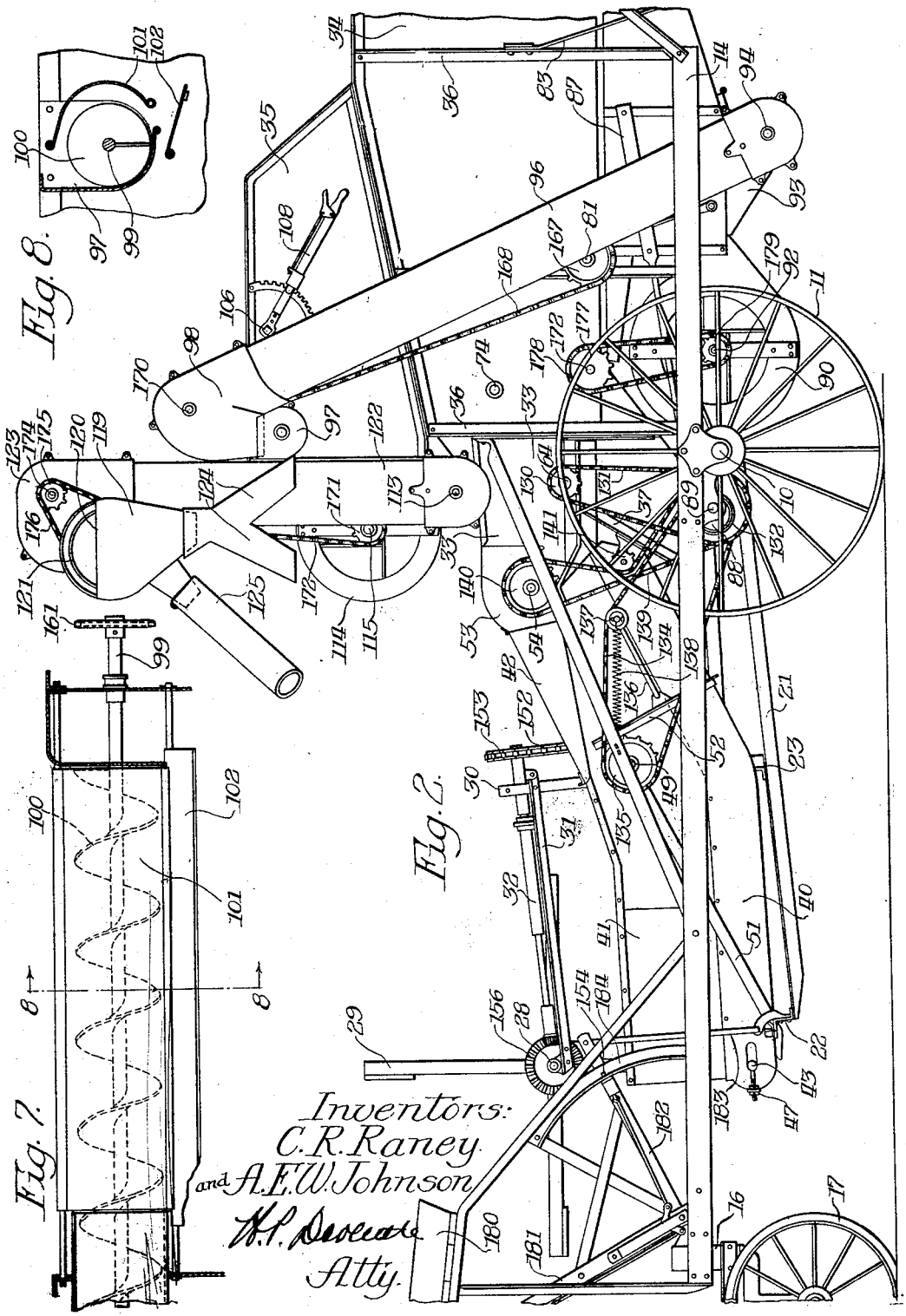
Figure 2 is a side elevational view of the same structure shown in Figure 1, with the rear end of the separator housing cut off.

Inspection of Figures 1 and 2 shows that the entire machine is carried on a transversely extending axle 10, the same being carried at its stubbleward end by a main wheel 11, and at its grainward end by a grain wheel 12. The axle 10 is provided at spaced intervals along its length with brackets 13. Certain of these brackets which are conventional carry longitudinal frame members 14, the two stubblewardmost frame members 14 extending forwardly a considerable distance and converging, as shown in Figure 1, where they are secured together at their front ends by a block 15. In this block is turnably carried the spindle 16 of a pilot or steering tongue truck 17 for supporting the front end of the rigid main frame. These longitudinal frame members 14 are crossbraced and strengthened by transverse frame members 18. This much description of the rigid main frame will suffice for the present. We will next describe the movable frame, which supports the harvester or header.

II. *The movable frame and the header to the feeder*

Looking at Figures 1, 2, 3 and 5, it will be seen that the grainward end of the axle 10 is provided with a diagonally and forwardly extending frame member 19, which is pivoted to one of the brackets 13 on the axle, as shown. Stubblewardly of the member 19 the axle similarly carries another pivoted diagonal frame member 20, which crosses and is connected to the member 19. Another diagonal frame member 21 is secured to the member 20 near the axle 10 and extends forwardly and stubblewardly, as shown. The forward ends of the bars 19, 20 and 21 are connected by a cross or transverse Z-bar 22 and midway between their ends are connected by a frame angle bar 23. The bars 22 and 23 support the usual transversely disposed harvester header platform generally shown at 24. It will be noted that of the rigid frame only the two stubblewardmost longitudinal bars 14 extend forwardly a considerable distance beyond the axle 10, and that the transverse bars 22 and 23 of the movable frame structure now being described stop a slight distance short of these two stubblewardmost rigid bars 14.

The forward end of the header platform 24 is conventionally provided with grain cutting mechanism indicated by the finger bars 25.

As shown in Figure 1, it will be seen that the platform is provided with the usual grain receiving main conveyer 26. The front end of the platform is so constructed that its Z-bar 22 carries an upright angle iron support 27 on which is suitably carried for rotation a reel shaft 28 conventionally carrying a harvester reel 29. The rear end of the platform 24 carries a similar upright 30, the two uprights being connected by a cross support 31, as shown in Figures 1 and 2. The reel is suitably driven by a telescopic shaft 32 journaled on the frame supports 27, 30 and 31. This driving mechanism will be better described in detail in the chapter entitled "The complete driving mechanism".

From this detailed description of the movable frame and header or harvester mechanism, it will now be appreciated that the entire harvester and its frame are pivotally mounted on the axle 10 and may have an up and down movement entirely independently of and relative to the rigid main frame heretofore described. We will now describe the thrashing or separating mechanism, including the feeding mechanism, which takes the grain from the platform conveyer and feeds it to the separating mechanism.

III. *The thrasher or separator and the feeder*

The main frame, which it will be remembered is rigid, carries substantially along its longitudinal center, the separator housing which in the main comprises a thrashing cylinder housing 33, a main separator housing 34 disposed to the rear thereof and in communication therewith, said main separator housing carrying thereabove and in communication therewith, a second separator, or recleaner housing 35, all of which is clearly shown in Figures 1, 2, 3 and 4. These housings are made fast to the main frame by any suitable supports, such as 36 shown in Figure 2.

Figure 3:
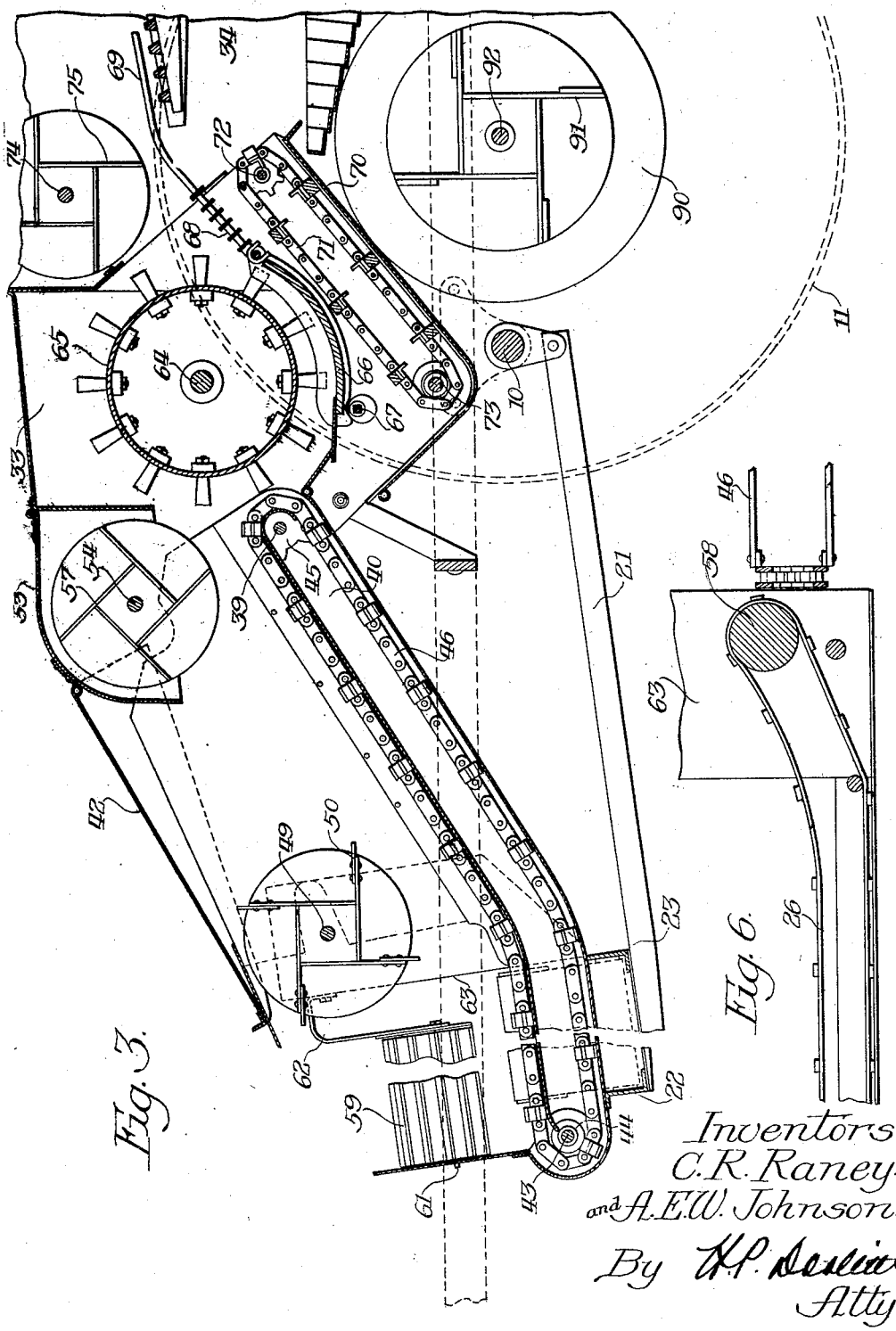
Figure 3 is a vertical sectional view taken along the line 3—3 of Figure 1, showing when viewed in the direction of the arrows, an elevational cut through the feeder mechanism back to the front end of the separating mechanism.

As shown in Figure 5, one of the transverse frame pieces 18 carries an upwardly inclined support 37 which is provided near its upper end with a supporting bracket 38 in which is journaled a transverse shaft 39 made fast in the bracket 38 by any suitable means. Of course this structure is duplicated on the back side of the machine. Extending forwardly from the thrashing cylinder housing 33 and in communication therewith, as shown in Figure 3, is a longitudinally disposed feeder conveyer housing 40, which it will be observed is pivotally mounted on the shaft 39, the same extending downwardly therefrom and then forwardly at an angle, the forward portion slidably resting on the header platform 24. The housing 40 has a superstructure in the form of an upper housing part 41, the housing being closed on all sides except at its forward grainward side and having a hinged cover 42 on its top side. Journaled in the front end of the lower housing 40 is a transversely disposed shaft 43. This shaft 43 is provided with a roller 44, and the upper shaft 39 is provided with sprocket wheels 45, (only one being shown), there being trained around the roller and sprocket wheels an endless chain and lag conveyer 46. The forward roller shaft 43 may be adjusted by a bolt 47 to tension the conveyer 46 to take slack out of the same, should the same become loose in operation. It is to be noted that the upward incline of this conveyer is not very great. Adjacent the bend in the feeder conveyer 46 and directly thereabove, the upper housing 41 is provided with an elongated slot 48 on its opposite sides in which is slidably mounted a transverse shaft 49, (see Figures 2, 3 and 5), this shaft 49 carrying a beater 50, the beater having paddles as shown in Figure 3. The shaft 49 has a link connection 51, as shown in Figure 5, which is made fast to the Z-bar 22 at the front end of the header platform. The upper and lower housings, as shown in Figure 5, are strengthened and braced by a brace 52, which connects the two housings together.

At the rear end of the housing 41 and in front of the thrasher cylinder housing 33 is a supplemental beater housing 53, shown in Figures 2, 3 and 5, this housing being provided with a shaft 54 extending transversely therethrough, said shaft being journaled in a bearing in the upper end of a bracket 55 secured to the forward end of a longitudinal frame member 56 carried by the supports 37. This shaft 54 is provided with a beater 57, also having paddles similar to the beater 50, as shown in Figure 3.

The improved mechanism for delivering the material or grain from the header platform conveyer 26 into the feeder housing will now be described. Looking at Figure 6, it will be seen that the stubbleward end of this conveyer 26 is inclined slightly upwardly and has its end supported by a roller shaft 58. It will be seen that the conveyer 26 communicates with the feeder housing at right angles and that the roller shaft 58 is so disposed that the conveyer apron 26 in running thereover will drop the grain directly onto the feeder conveyer 46 running around the shaft 43. It will be seen in Figure 3 that a supplementary, short, upper platform conveyer 59 is provided and that the same is trained around a roller shaft 60 (Figure 1) arranged longitudinally across the platform at its stubbleward end adjacent the feeder housing 41. This shaft 60 is journaled in any suitable brackets, not shown, which may be made fast respectively to the front and rear ends of the platform of the reaper. In Figure 3, it will also be seen that the supplementary conveyer 59 is carried on another roller shaft 61 which is journaled in the walls of the supplementary conveyer at its front and rear.

It should here be noticed that the main platform conveyer 26 and the supplementary or upper conveyer 59 rotate in opposite directions to feed the material from the header platform between the two conveyers and guide the same onto the right angularly moving feeder conveyer 46. The supplementary or upper conveyer 59, it will be noticed, is spaced forwardly, as shown in Figures 1 and 3, by means of brackets 62, from the rear wall 63 of the header platform. This is a very desirable feature, as it improves the feeding mechanism to such an extent that the material coming from the platform and making the turn onto the feeder conveyer cannot wrap or wind, because no sharp confined wall corner is presented to the material moving in this right angular path.

Figure 4:
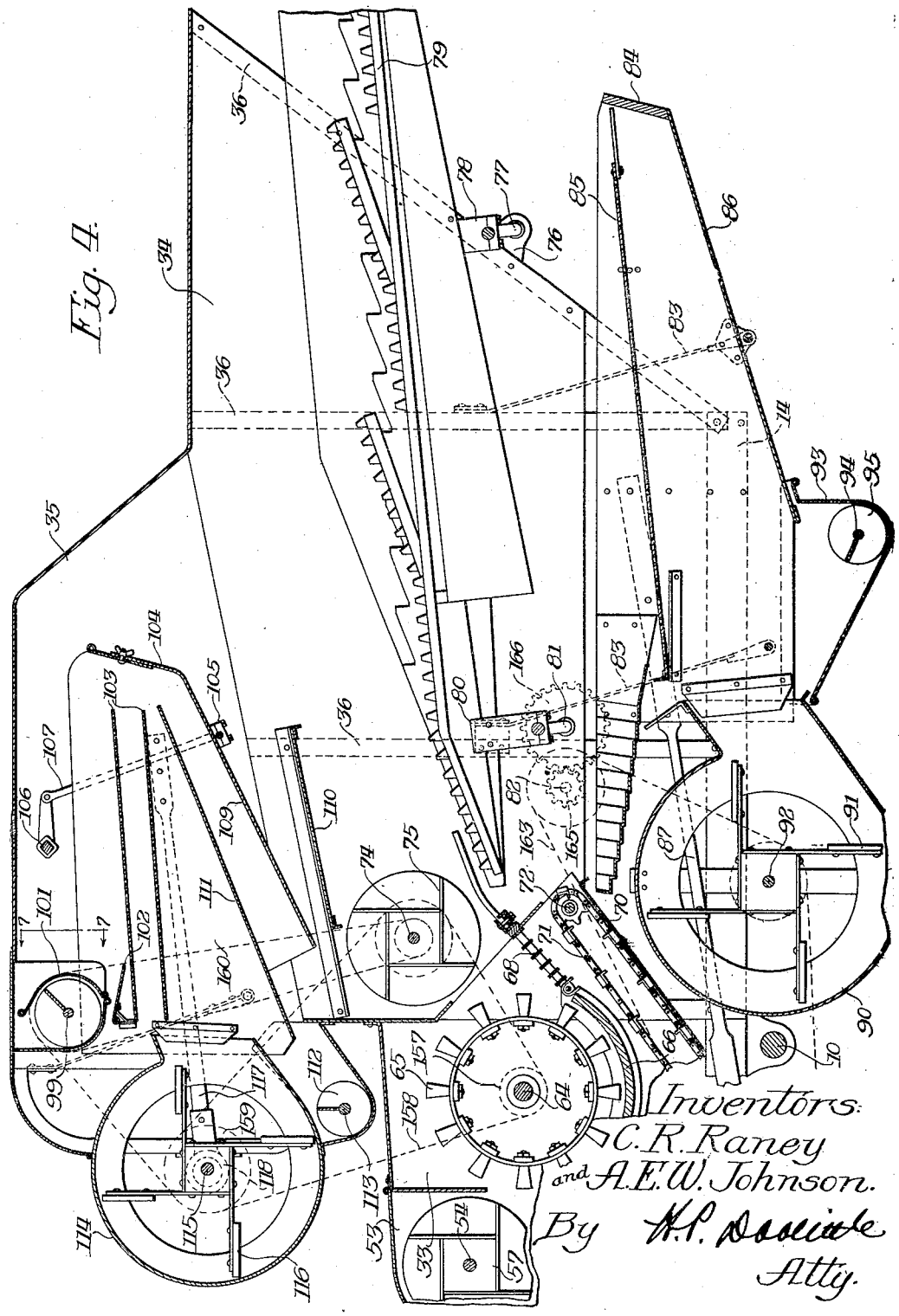
Figure 4 is a similar view taken along the line 4—4 shown in Figure 1, looking in the direction of the arrows and illustrating a vertical sectional cut of the separator mechanism from the thrashing cylinder housing rearwardly to the back end of the machine.

Reference should now be made to Figures 3 and 4 wherein it will be seen that just over the rear end of the longitudinal feeder conveyer 46 there is disposed in the cylinder housing 33 a transverse shaft 64. This shaft is journaled on the horizontal frame members 56, only one of which is shown, as will be understood. This shaft 64 carries the usual thrashing cylinder 65, which may be termed broadly as a grain receiving element. In this same housing beneath the cylinder is the usual cylinder concave 66, which may be adjusted to and from the cylinder by the cam means 67, and extending rearwardly from the rearmost upper end of the concave 66 are the usual grate bars 68 and finger extension 69, the latter projecting into the main separator housing 34. It can now be appreciated that the beater 57 helps to feed material over the top of the longitudinally disposed feeder conveyer 46, to deliver the material underneath the thrashing cylinder, where the cylinder teeth, in combination with the concave 66 initially separate the grain and straw. It will be noticed that the housing underneath the cylinder 65 is formed of inclined walls in the shape of a V and that along its rear wall 70 there is disposed a chain and lag conveyer 71 carried on the usual sprockets mounted on a transverse shaft 72 at its upper end, and a similar shaft 73 at its lower end carrying a roller the lag bars on the conveyer 71 serving to elevate grain that falls down through the concave, by pushing the grain upwardly over the inclined wall 70, it being understood that this conveyer moves in a counter-clockwise direction.

The main separator housing 34, of course, communicates with the cylinder housing, and at the point where they communicate (see Figure 4) and just above the grate bars 68, there is arranged on a transverse shaft 74 another paddle beater 75.

Journaled in a bracket 76, made fast to one of the rear supports for holding the housing 34 on the main frame bars 14, is a crank shaft 77 and, by means of suitable blocks 78, this crank shaft 77 carries the usual straw walkers and fish backs 79. The forward ends of these straw walkers 79 are similarly carried by blocks 80 supported by a crank shaft 81, which also is transversely disposed and journaled in the housing 34. A stub shaft 82 is transversely disposed on the outside of the housing intermediately between the shaft 72 and the shaft 81. Underneath the straw walkers 79, the supports 36 for the housing 34 carry, by means of flat springs 83, a vibratory, shaking screen or riddle unit 84, which includes a perforated screen 85 and an inclined bottom 86. This screening unit 84 is vibrated by means of a pitman 87 made fast thereto at one end, and at its other end the said pitman is connected to an eccentric 88 (see Figure 2) carried on a transverse shaft 89 suitably journaled in brackets depending from the rigid main frame bars 14, as shown clearly in Figures 2 and 5, said shaft being disposed slightly in front of the axle 10.

Underneath the front ends of the straw walkers 79 and vibrating unit 84, the housing 34 has formed therein a fan casing 90, the casing having therein a blower fan 91 journaled on a transversely disposed shaft 92 carried in the casing. Between the fan casing 90 and the lower end of the inclined bottom 86 of the vibrating unit 84, there is disposed an auger housing 93 in which is rotatably journaled on a shaft 94 a screw feeding means or auger 95.

From so much of the detailed description, it will be seen that the thrashing cylinder is quite low, and that as a result only a slight elevation of the grain from the header platform is necessary. This has been accomplished by the provision of two inclines, one in the header platform conveyer and the other in the feeder conveyer. Also, it is to be kept in mind that all of the mechanism rearwardly of the thrashing cylinder for performing the major thrashing or separating operation lies beneath a horizontal plane passing through the top of the thrashing cylinder.

Looking to Figure 2, it will be observed that this auger 95 feeds grain laterally into an inclined elevator housing 96 wherein is disposed any suitable form of elevating mechanism, which moves the material into a trough 97 by means of an elbow 98 leading from the upper end of the elevator housing 96. This brings us to a description of the supplementary thrashing or recleaning mechanism which is carried in the housing 35 arranged on top of the main housing 34.

For this purpose, attention is directed to Figures 4, 7 and 8. In the upper end of the housing 35, there is arranged a transverse shaft 99 which carries an auger or screw feeding mechanism 100, which receives the grain elevated by the elevator 96. The grain moves along the trough 97 upon rotation of the auger 100, the rear end of the trough being closed by a pivoted or hinged wall 101. Thus, grain moving through this feeding mechanism is confined by the hinged part 101 in the trough 97 until said trough completely fills, and the pressure thus exerted by the grain is so great that it will swing the hinged part 101 rearwardly, thus letting the grain spill out evenly onto a chute 102, which directs the grain onto perforated screens 103 disposed one above the other in a second vibratory riddling unit 104 carried by the block 105 supported from a rock shaft 106 by means of a pivoted link 107. The rock shaft 106 may be rocked by an exterior lever mechanism 108 shown in Figure 2 for the purpose of manually adjusting this vibratory unit 104. It will be observed that this unit 104 has an inclined bottom 109 and that any chaff or straw which is tossed over the end of the screens 103 falls down this inclined bottom 109 to be blown out of the machine under the inclined table, or deflector, 110, as clearly shown in Figure 4. The front end of the table 110 is open so that the chute 109 communicates with the blower or beater 75 to expel straw and chaff, as stated. This unit 104 also embodies an inclined portion 111 which catches the grain and weed seed dropping through the perforate screens 103 to direct the same to an auger 112 mounted on a shaft 113. At the front end of the recleaner housing 35, there is formed a blower housing 114 within which is carried a shaft 115 on which is mounted a blower fan 116, which functions to direct a blast of air across the screens to remove the straw and chaff from the grain and weed seed and to blow the same out of the machine, while the grain and weed seed are caught by the auger 112 and conveyed into a seed classifying mechanism. The unit 104 is vibrated by means of a pitman 117 which is reciprocated by means of an eccentric 118 carried on the shaft 115.

The seed classifying mechanism will now be described. It is generally indicated in Figures 1 and 2 at 119, the same being in the form of a cylindrical housing open at one end, as at 120, and contained therein is a cylindrical perforated screen 121. Looking at Figures 2 and 4, it will be seen that the auger 112 of the recleaner directs all of the seed laterally into an elevator 122 in which is housed suitable elevating mechanism for elevating the grain upwardly, and, by means of an elbow spout 123, directs the grain axially to the inside of the cylindrical perforated screen 121. The grain seed being the larger, it cannot pass through the perforations of the screen 121 and is thus moved therealong to the discharge spouts 124, while the weed seed readily passes through the screen 121 and comes out of the opposite end of the cylinder housing 119 and is discharged through the spout 125. Here the grain and weed seeds can be caught in bags, as previously stated. Of course, when a classifier is not employed the grain can be discharged from the recleaner directly into a grain tank or bin carried on the main frame, or into a barge drawn alongside the machine. There has now been described all of the thrasher mechanism including the feeder, which takes the grain from the header platform, and likewise the successive mechanisms, to-wit, the thrasher cylinder, the main separating mechanism, the recleaner, and the classifier. The complete driving mechanism for the entire machine will next be described.

*IV. The complete driving mechanism*

Looking at Figure 1, it is to be seen that between the separator housing and the grain wheel 12 there is a frame super-structure 126 mounted on the main frame. This frame structure carries an engine 127. The structure may be braced by braces 128, as shown.

This engine is so mounted that its crank shaft 129 is transversely disposed and in line with and connected to the thrashing cylinder shaft 64. The stubbleward end of the shaft 64 carries, as shown in Figure 2, a sprocket wheel 130, which is geared by a sprocket chain 131 to a sprocket wheel 132 on the stubbleward end of the shaft 89. The shaft 89, adjacent the sprocket wheel 132, carries another sprocket wheel 133, shown in Figure 5, said sprocket wheel being connected by a forwardly extending chain 134 to the beater shaft 49 by means of a sprocket wheel 135.

Here it is to be observed that the brace 52 has pivoted to it, intermediately of its ends, a rearwardly and upwardly extending arm 136, which carries at its free end a roller 137 which engages the chain 134, as shown. This arm is tensioned by means of a spring 138 connected thereto and to the housing 41. Thus, the roller 137 serves as a chain tightener, as will be understood.

The shaft 89 carries still another sprocket wheel, not shown, grainwardly beyond the wheel 133, just described. From this third wheel, there is a chain connection 139 (Figures 1 and 2) extending upwardly to a sprocket wheel 140 on the stubbleward end of the beater shaft 54, to drive said shaft and beater 57. The back run of this chain 139 is bellied forwardly and trained around a sprocket wheel 141 on the shaft 39 to drive the feeder conveyer 46.

Near its grainward end the shaft 89 carries a bevel gear 142 (Figures 1 and 5) meshing with a bevel pinion 143 on a forwardly extending shaft 144. This shaft 144 extends along the grainward side of the feeder housing. The shaft is provided with a universal coupling 145 and a slip clutch 146, the shaft furthermore being extensible, as shown.

Said shaft extends longitudinally across the header platform 24 and carries at its forward end a crank 147 which is connected to a pitman 148 for reciprocating the cutting mechanism of the header, shown at 149. The shaft 144 is provided with a spur gear 150 at the back side of the platform, which meshes with a spur gear 151 connected to drive the roller shaft 58 of the platform conveyer 26. This roller shaft is connected by a chain 152 with the shaft 60 of the upper platform conveyer to drive said conveyer, and is additionally trained around a sprocket wheel 153 on the shaft 32, as shown in Figures 1 and 2.

The shaft 32 is an extensible one, as shown, and carries at its front end a bevel gear 154 journaled in a bracket 155 mounted on the reel shaft 28 and frame piece 31. This gear 154 meshes with a bevel pinion 156 on the reel shaft. In this manner the reel 29 is driven.

The grainward end of the cylinder shaft 64 carries a sprocket wheel 157 (see Figures 1 and 4). This wheel 157 has a chain 158 trained therearound and connected to a sprocket wheel 159 on the shaft 115 to drive the blower 116 for the recleaner, and the eccentric 118 which vibrates the riddling unit 104. The chain 158 is additionally trained around a sprocket wheel to drive the shaft 74 and beater 75, as shown. A chain connection 160 from the shaft 74 drives the shaft 99 of the auger 100 by means of a sprocket wheel 161, shown in Figure 7.

The grainward end of the shaft 89 carries a sprocket wheel 162, seen in Figure 1, and this sprocket has a chain connection 163 with a sprocket wheel 164 on the stub shaft 82 heretofore mentioned. (See also Figure 4). The stub shaft 82 also carries a spur gear 165 meshing with a spur pinion 166 on the crank shaft 81 to operate the straw walkers 79. This shaft 81 extends through the separator housing, as shown, and on its protruding stubbleward end, it carries a sprocket wheel 167, see Figure 2, around which is trained a chain 168, extending upwardly and around a sprocket wheel 169 on a shaft 170 in the elbow 98 of the elevator housing 96. This connection operates the mechanism of the elevator.

As shown in Figure 2, the stubbleward end of the blower shaft 115 carries a sprocket wheel 171, and a chain 172 connects this wheel 171 with a sprocket wheel 173 (see Figure 1) on a shaft 174 extending transversely through the elbow 123 at the upper end of the elevator 122. The stubbleward end of this shaft carries a sprocket wheel 175 around which is trained a chain 176 operating the cylindrical screen 121 of the seed classifier.

The shaft 72 goes through the stubbleward end of the separator housing and carries a sprocket wheel 177 which has a chain connection 178 to drive a sprocket wheel 179 for operating the blower on the shaft 92 (see Figure 2).

There has thus been traced through from the engine the drive to the various operative parts of the thrasher. We will now consider the next chapter heading.

V. Means for adjusting the harvester platform

Of course, it is well known in harvester thrashers that the harvester heading platform of the machine must be made vertically adjustable up and down for the purpose of adjusting the cutting mechanism of the platform with respect to the length of the grain encountered. Such adjustment must be capable of being made while the machine is traveling along. Such mechanism has here been provided. Looking to Figures 1 and 2, it will be seen that such adjusting mechanism is controlled by the operator seated on a seat 180 disposed on the front end of the rigid main frame. Pivoted on the frame is a lever 181 having a bell crank extension 182 having its free end connected to a link 183 connected to the Z-bar 22 of the header platform. Any suitable detent device 184 is provided to lock the lever in adjusted position.

From this description it will be seen that operation of the hand lever 181 will pull up or push down on the link 183 to raise or lower the platform. It will be remembered that the header platform is carried on bars which are pivotally connected to the axle 10. Any suitable form of conventional balancing springs may be used to assist in raising or lowering the platform, such springs not having been shown, so as not unduly to complicate the drawings. It will here also be recalled that the feeder conveyer housing 40 with its superstructure 41 is pivotally suspended from the shaft 39 supported from the non-movable or rigid thrasher part. As shown very clearly in Figure 5, it can then be seen that, as the platform is raised, the conveyer and superstructure housing slide forwardly thereon for the simple reason that each of these parts, to wit, the conveyer housing and the platform, is carried on its own pivot entirely independently of each other. The hinged cover 42 likewise is mounted on its own independent pivot, as clearly shown in Figure 5, and, as a result, may have a relative sliding movement with the top of the superstructure 41 when the feeder is adjusted up and down with the header platform.

A very important feature of this invention is the connection of the beater shaft 49 with the Z-bar 22 by means of the link 51. As a result, when the platform is moved up and down, the beater on the shaft 49 is always maintained the same distance away from the rear side of the supplementary or upper platform conveyer 59, and, thus, the beater on this shaft 49 will always evenly and regularly feed the material along the feeder conveyer 46, regardless of the adjusted position of the header platform. Furthermore, the chain tightening mechanism, shown in Figure 5, and particularly the spring pressed arm 136 and roller 137 serve to maintain the driving chain 134 for this beater on the shaft 49 at all times taut, so that the parts will be driven at a constant and uniform speed.

This concludes the detailed description or specification of each of the groups making up the complete harvester-thrasher of this invention, and we will now proceed with the description in summary form of the use and operation of the machine.

VI. *Summary: Operation of complete machine*

As shown in Figures 1 and 2, the forward part of the main frame is carried on the pilot truck 17 and the main and grain wheels complete the wheel supports for the machine. As the machine is pulled through the field, it cuts the grain which is pushed backwardly onto the conveyer 26 by the reel 29 in the usual manner. The header platform may be adjusted vertically up or down, depending upon the height of the grain encountered, by the operator of the machine upon manipulation of the lever 181.

The conveyer 26 advances the grain laterally with a first slight step up in combination with the supplementary upper platform conveyer 59 into the feeder housing 41 where the grain is moved longitudinally rearwardly by the right angularly moving feeder conveyer 46, which, in turn, with the aid of the beaters 50 and 57, directs the grain to the thrashing cylinder 65. Here it is to be noted that there is a slight second step up for the moving grain on the conveyer 46 and that the beater 50 is disposed at the foot of this incline to assist in the feeding of the grain upwardly. The thrashing cylinder moves in a counter-clockwise direction with the grain directed underneath the same to be initially thrashed with the assistance of the concave 66. Most of the grain is separated from the straw at this point and drops through the concave onto the grain elevating conveyer 71, which moves in a counter-clockwise direction to elevate the grain therebeneath and between it and the inclined bottom 70, so that the greater percentage of the grain, with any chaff that may remain, may be directed onto the riddling unit 84 lying in a horizontal plane beneath the thrashing cylinder shaft 64. The riddling unit 84 is vibrated very rapidly so that the grain may pass through the perforated screen 85 and be directed by the inclined bottom 86 to the auger 95.

That portion of grain which is not entirely separated from the straw and chaff at the cylinder is carried upwardly across the grate bars 68 and fingers 91 by the counter-clockwise moving beater 75 onto the fish back and straw walker unit 79, which further acts to shake the grain therethrough and onto the unit 84 and through the screen 85 thereof to the auger 95. All of this time the blower 91 is rotating to expel the straw and chaff rearwardly out of the machine.

The elevating mechanism in the housing 96 takes the grain and such chaff as may remain from the auger 95 and elevates it upwardly to the auger 100 of the recleaner in the housing 35. When the trough of the auger has been completely filled with grain the hinged door part 101 thereof swings rearwardly to let the grain evenly distribute itself, by means of the shield 102, onto the screens 103 through which the grain passes and drops upon the inclined bottom 111, which serves to direct the cleaned grain and other seed to the auger 112. The straw and chaff cannot, of course, pass through the screens 103 and thus drops over the rear end thereof and onto the inclined bottom 109, where it will slide downwardly and be caught by a blast of air directed from the blower 116 to be expelled rearwardly under the table 110 and onto the straw walker and fish back unit 79 to be moved and blown out of the rear end of the machine.

The auger 112 delivers the grain into the elevating mechanism in the housing 122 and directs the grain seed along with the weed seed into the cylindrical screen 121 of the classifying mechanism 119 and, as heretofore described, functions to discharge the grain seed through the spouts 124 and the other seed through the spout 125.

It is to be understood, of course, that in this disclosure there has been shown only an illustrative embodiment which this invention may assume in practice and that the same is susceptible of many changes in the arrangement of parts and mechanisms without departing from the spirit and scope thereof. It is the intention to cover all such modifications as fairly fall within the scope of this invention as indicated in the following claims.

What is claimed is:

1. In a harvester-thrasher, the combination of a main frame and a header frame, a feeder hung from the main frame and supported on the header frame, a beater above the feeder, said beater being carried in slotted ways, and a link connection from the beater to the header frame.

2. In a harvester-thrasher, the combination of a frame carrying a main conveyer, a supplementary upper conveyer narrower than the main conveyer and arranged above and at one side of the main conveyer, a feeder conveyer communicating with the main and supplementary conveyers at a right angle, a beater above the feeder carried in slotted ways, and a rigid link connection from the beater to the frame.

3. A harvester-thrasher having a main frame carried on an axle, a supplementary movable frame pivotally hung from the axle of the machine, said movable frame carrying a platform, a feeder housing pivoted on structure carried by the main frame at a point above the axle, said feeder housing having its front end slidably supported on the platform, said feeder housing including a shaft and a beater freely movable in slotted bearings, and a connection from the shaft of the beater to the front part of the platform.

4. A harvester-thrasher having a main frame carried on an axle, a housing thereon, a supplementary frame pivotally hung from the axle, said pivoted frame carrying a platform, and a feeder housing pivoted on the first housing, said feeder housing having its front end slidably supported on the platform.

5. A harvester-thrasher having a main frame carried on an axle, a supplementary frame pivotally hung from the axle, said pivoted frame carrying a platform, and a single feeder conveyer pivotally hung from a point above the main frame, said conveyer having its front end slidably supported on the platform.

6. A harvester-thrasher having a main frame carried on an axle, a housing thereon, a supplementary movable frame pivotally hung from the axle of the machine, a feeder pivotally hung from the housing and having its front end slidably mounted on the movable frame, means for adjusting the supplementary frame and feeder as a unit up or down, a beater for the feeder, driving connections including a chain for operating the beater, and means for maintaining said chain under uniform tension during up and down movement of the feeder.

7. A harvester-thrasher having a main frame carried on an axle, a housing thereon, a supplementary movable frame pivotally hung from the axle of the machine, a feeder pivotally hung from the housing and having its front end slidably mounted on the movable frame, means for adjusting the supplementary frame and feeder up or down as a unit, a beater for the feeder, driving connections including a chain for operating the beater, and a chain tightener for maintaining said chain under uniform tension in all positions of adjustment of the platform and feeder.

In testimony whereof we affix our signatures.

CLEMMA R. RANEY.
ARNOLD E. W. JOHNSON.